United States Patent
Zhou

(10) Patent No.: US 12,484,126 B2
(45) Date of Patent: Nov. 25, 2025

(54) MULTI-CHANNEL LIGHT-EMITTING DIODE (LED) LINEAR DRIVER CIRCUIT

(71) Applicant: Wuxi ORG Microelectronics co., Ltd, Wuxi (CN)

(72) Inventor: Zhicheng Zhou, Wuxi (CN)

(73) Assignee: Wuxi ORG Microelectronics co., Ltd, Wuxi (CN)

( * ) Notice: Subject to any disclaimer, the term of this patent is extended or adjusted under 35 U.S.C. 154(b) by 100 days.

(21) Appl. No.: 18/630,756

(22) Filed: Apr. 9, 2024

(65) Prior Publication Data

US 2024/0306276 A1  Sep. 12, 2024

(30) Foreign Application Priority Data

Jan. 16, 2024 (CN) .......................... 202410062604.2

(51) Int. Cl.
| | |
|---|---|
| H05B 45/395 | (2020.01) |
| H05B 45/10 | (2020.01) |
| H05B 45/305 | (2020.01) |
| H05B 45/37 | (2020.01) |
| H05B 47/165 | (2020.01) |

(52) U.S. Cl.
CPC ........... *H05B 45/395* (2020.01); *H05B 45/10* (2020.01); *H05B 45/305* (2020.01); *H05B 45/37* (2020.01); *H05B 47/165* (2020.01)

(58) Field of Classification Search
CPC .... H05B 45/395; H05B 45/10; H05B 45/305; H05B 45/37; H05B 47/165; H05B 45/20; H05B 45/46; H05B 45/30
See application file for complete search history.

(56) References Cited

U.S. PATENT DOCUMENTS

| | | | |
|---|---|---|---|
| 12,082,319 B2 * | 9/2024 | Kanemitsu | H05B 45/395 |
| 2014/0035479 A1 * | 2/2014 | Hsieh | H05B 45/325 |
| | | | 315/224 |

FOREIGN PATENT DOCUMENTS

CN  104883780 B  6/2017

* cited by examiner

*Primary Examiner* — Minh Tran

(57) ABSTRACT

A multi-channel light-emitting diode (LED) linear driver circuit, including a switch-triggering loop, a dimming drive loop and an output loop. The switch-triggering loop is configured to detect a triggering situation of an external switch and send a switching control signal according to the triggering situation of the external switch. The dimming drive loop is configured to generate at least two drive signals. The output loop includes at least two output ports respectively connected to the least two drive signals. The switch-triggering loop is connected to the output loop. The switching control signal is configured to control connection or disconnection of each of the at least two output ports.

10 Claims, 8 Drawing Sheets

MULTI-CHANNEL LIGHT-EMITTING DIODE (LED) LINEAR DRIVER CIRCUIT

CROSS-REFERENCE TO RELATED APPLICATIONS

This application claims the benefit of priority from Chinese Patent Application No. 202410062604.2, filed on Jan. 16, 2024. The content of the aforementioned application, including any intervening amendments made thereto, is incorporated herein by reference in its entirety.

TECHNICAL FIELD

This application relates to light-emitting diodes (LEDs), and more particularly to a multi-channel LED linear driver circuit.

BACKGROUND

In order to realize lighting and function switching of lights, the light-emitting diode (LED) driver circuits in the prior art are commonly provided with both a main control chip and an LED drive integrated circuit (IC). After connecting the main control chip to the LED drive IC, the LED drive IC is connected to a corresponding LED light. The main control chip is configured to control the operation of the LED drive IC, thereby controlling the operation of the LED light on a corresponding circuit, so as to achieve a drive control of the LED light.

It should be pointed out that although the above circuit of using the main control chip and the driver IC to operate together to drive LED lights can effectively drive the LED lights on a corresponding circuit, such setting method where both ICs must be used simultaneously increases the circuit scale and circuit cost to a great extent.

SUMMARY

In order to address the problems in the prior art of using both a main control chip and a driver integrated circuit (IC) to drive a light-emitting diode (LED) light, resulting in excessive circuit scale and high circuit cost, it is necessary to provide a multi-channel LED linear driver circuit with a simpler structure and lower cost.

Technical solutions of the present disclosure are described as follows.

This application provides a multi-channel LED linear driver circuit, comprising:
 a switch-triggering loop;
 a dimming drive loop; and
 an output loop;
 wherein the switch-triggering loop is configured to detect whether an external switch is triggered, and send a switching control signal in response to a case that the external switch is triggered;
 the dimming drive loop is configured to generate at least two drive signals respectively configured to drive at least two external LED lights to operate; and
 the output loop comprises at least two output ports in one-to-one correspondence with the least two drive signals; the least two drive signals are configured to be respectively transmitted to the at least two output ports; the switch-triggering loop is connected to the output loop; and the switching control signal is configured to control connection or disconnection of each of the at least two output ports.

In some embodiments, the multi-channel LED linear driver circuit further comprises an internal power conversion loop; wherein an input end of the internal power conversion loop is connected to an external direct current (DC) power supply or an external alternating current (AC) power supply; and an output end of the internal power conversion loop is configured as an internal power supply end.

In some embodiments, the switch-triggering loop comprises a resistor-capacitor (RC) filter module, a debounce filter module and an enable signal generating module; an input end of the RC filter module is configured to interact with the external switch; an output end of the RC filter module is connected to an input end of the debounce filter module; an output end of the debounce filter module is connected to the enable signal generating module; and an output end of the enable signal generating module is configured to generate the switching control signal.

In some embodiments, the RC filter module comprises a first filter resistor, a second filter resistor and a third filter resistor; a first end of the first filter resistor is connected to ground, a second end of the first filter resistor is connected to a first end of the second filter resistor, and a second end of the second filter resistor is connected to the internal power supply end; and a first end of the third filter resistor is connected to the second end of the first filter resistor and the first end of the second filter resistor, and a second end of the third filter resistor is connected to the debounce filter module.

In some embodiments, the debounce filter module comprises a Schmitt trigger and at least one first-order filter; the at least one first-order filter is sequentially arranged; an input end of the Schmitt trigger is connected to the third filter resistor, and an output end of the Schmitt trigger is connected to an input end of a first one among the at least one first-order filter; and an output end of the first one among the at least one first-order filter is connected to an input end of a second one among the at least first-order filter or an input end of the enable signal generating module.

In some embodiments, the enable signal generating module comprises a voltage comparator and a voltage logic controller; a non-inverting input end of the voltage comparator is connected to an output end of a last one among the at least one first-order filter; an inverting input end of the voltage comparator is connected to a reference voltage signal; an output end of the voltage comparator is connected to an input end of the voltage logic controller; and an output end of the voltage logic controller is configured to output at least two enable signals.

In some embodiments, the enable signal generating module comprises a current comparator and a current logic controller; a non-inverting input end of the current comparator is connected to an output end of a last one among the at least one first-order filter; an inverting input end of the current comparator is connected to a reference current signal; an output end of the current comparator is connected to an input end of the current logic controller; and an output end of the current logic controller is configured to output at least two enable signals.

In some embodiments, the enable signal generating module comprises a frequency comparator and a frequency logic controller; a non-inverting input end of the frequency comparator is connected to an output end of a last one among the at least one first-order filter; an inverting input end of the frequency comparator is connected to a reference frequency signal; an output end of the frequency comparator is connected to an input end of the frequency logic controller; and an output end of the frequency logic controller is configured to output at least two enable signals.

In some embodiments, the output loop comprises at least two output modules; an input end of each of the at least two output modules is configured to receive a corresponding one of the at least two drive signals; an on-off control end of each of the at least two output modules is configured to receive a corresponding one of the at least two enable signals; and an output end of each of the at least two output modules is configured to be connected to a corresponding one of the at least two external LED lights.

In some embodiments, each of the at least two output modules comprises an output operational amplifier and an output switch tube; a non-inverting input end of the output operational amplifier is connected to one of the at least two drive signals; an inverting input end of the output operational amplifier is connected to a source of the output switch tube; a control end of the output operational amplifier is connected to one of the at least two enable signals; and an output end of the output operational amplifier is configured as one of the at least two output ports for connection with one of the at least two external LED lights.

Compared with the prior art, this disclosure has the following advantages.

The multi-channel LED linear driver circuit provided in this application has a simple structure and is easy to integrate. When the multi-channel LED linear driver circuit is applied to a specific LED light driver circuit, multi-channel LED lights can be driven by a single IC resulting from the integration of a single circuit, which greatly reduces the circuit scale, and facilitates easier integration of the circuit, a significant reduction in the circuit cost and easier implementation.

BRIEF DESCRIPTION OF THE DRAWINGS

In order to make the technical solutions of the embodiments of the present disclosure or the technical solutions in the prior art clearer, the accompanying drawings required in the description of the embodiments or prior art will be briefly described below. Obviously, presented in the drawings are merely some embodiments of the disclosure. For those of ordinary skill in the art, other drawings can be obtained based on the drawings of the disclosure without making creative efforts.

The purpose, functional features and advantages of the present disclosure will be further described below with reference to the embodiments and the accompanying drawings.

DETAILED DESCRIPTION OF EMBODIMENTS

The technical solutions of the present disclosure will be clearly and completely described below in conjunction with the accompanying drawings and embodiments. Obviously, described below are only some embodiments of the present disclosure, instead of all embodiments of the present disclosure. Based on the embodiments in the present disclosure, all other embodiments obtained by those of ordinary skill in the art without making creative efforts shall fall within the scope of the present disclosure.

It should be noted that all directional indications (such as up, down, left, right, front, back . . . ) in the description of the embodiments are merely intended to explain a relative positional relationship, movement, etc. between components in a specific posture (as shown in the accompanying drawings). When the specific posture changes, the directional indication changes accordingly.

In addition, descriptions involving "first", "second", etc. in this application are only descriptive, and cannot be understood as indicating or implying relative importance or implicitly indicating the number of indicated technical features.

Therefore, features defined as "first" and "second" can explicitly or implicitly include at least one of the features. In addition, "and/or" in the entire specification includes three solutions. For example, A and/or B includes technical solution A, technical solution B, and a combination of A and B. Moreover, technical solutions in the embodiments can be combined with each other as long as the combined solution can be achieved by those of ordinary skill in the art. When the combination of technical solutions appears to be contradictory or cannot be realized, it should be deemed that such a combination does not exist and is not within the scope of the present disclosure defined by the appended claims.

Figure 1:
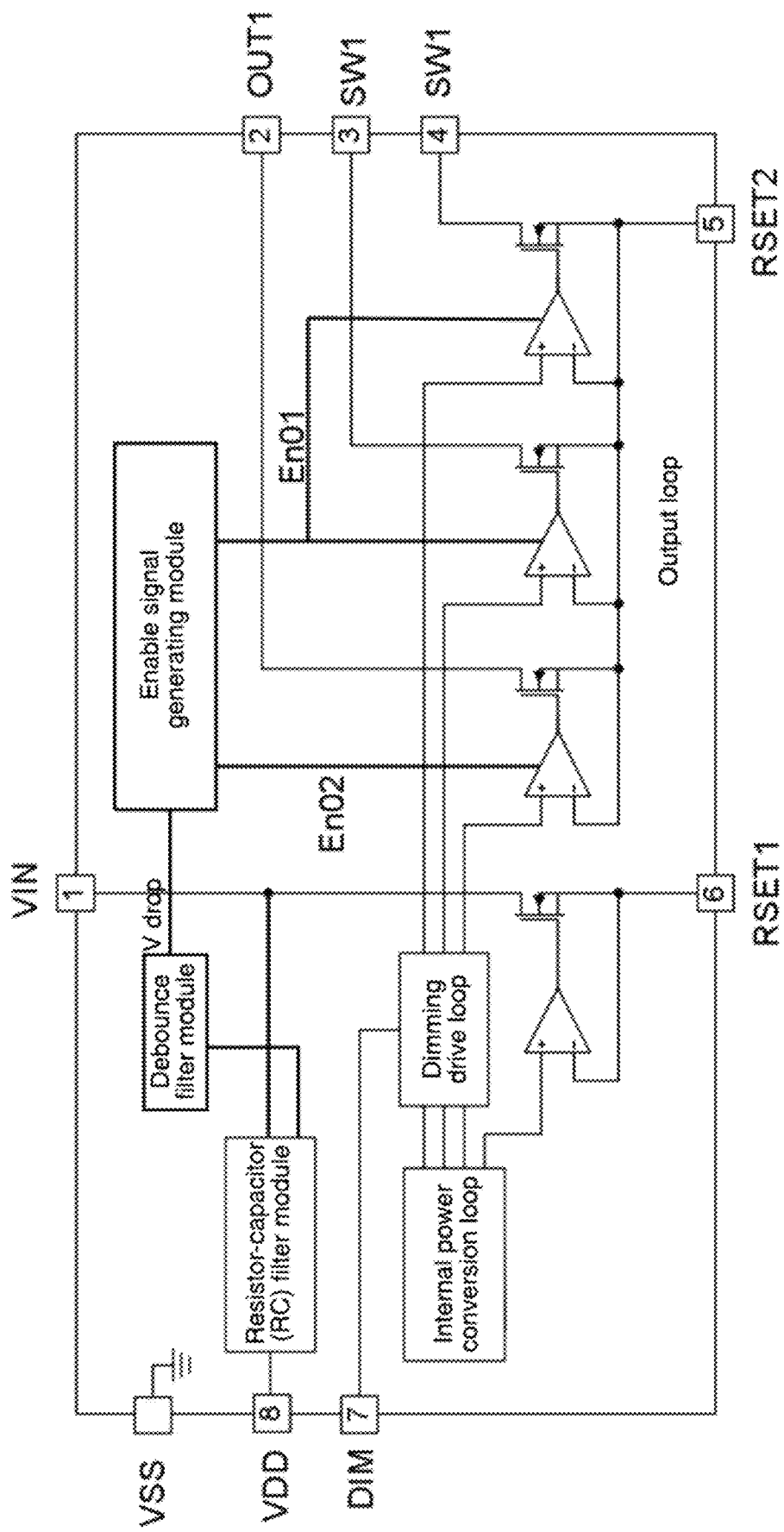
FIG. 1 schematically shows a multi-channel light-emitting diode (LED) linear driver circuit in accordance with an embodiment of the present disclosure.

As shown in FIG. 1, a multi-channel (light-emitting diode) LED linear driver circuit is provided, which includes an internal power conversion loop, a switch-triggering loop, a dimming drive loop and an output loop.

An input end of the internal power conversion loop is connected to an external direct current (DC) power supply or an external alternating current (AC) power supply.

An output end of the internal power conversion loop is configured as an internal power supply end VDD. The switch-triggering loop is configured to detect whether an external switch is triggered, and send a switching control signal in response to a case that the external switch is triggered. The dimming drive loop is configured to generate at least two drive signals respectively configured to drive at least two external LED lights to operate. The output loop includes at least two output ports in one-to-one correspondence with the least two drive signals. The least two drive signals are configured to be respectively transmitted to the at least two output ports. The switch-triggering loop is connected to the output loop. The switching control signal is configured to control connection or disconnection of each of the at least two output ports. When the multi-channel (light-emitting diode) LED linear driver circuit in this embodiment is applied to the drive of a specific LED light group, LED lights with different powers or different color temperatures can be correspondingly driven by different drive signals output from the output loop. The switch-triggering loop is configured to select which drive signal is allowed to be output according to a triggering condition of the external switch, thereby selecting which LED light to light. Therefore, the driver circuit provided in this embodiment can realize drive control of at least two-channel LED lights through a single circuit.

Figure 2:
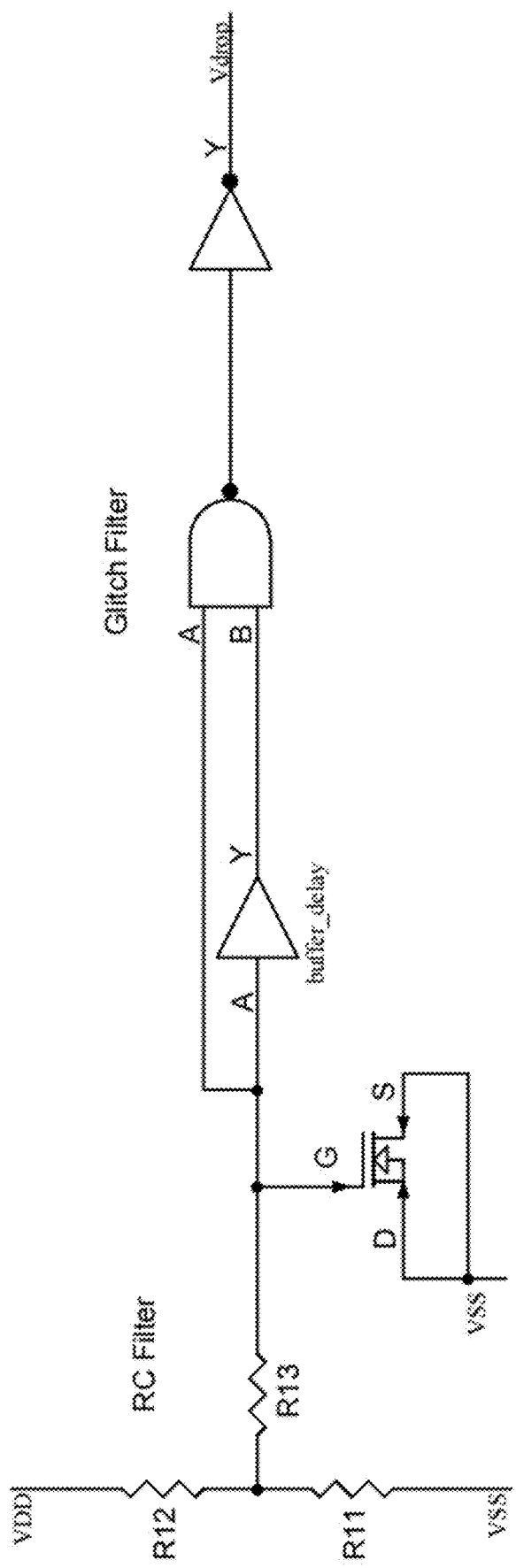
FIG. 2 schematically shows a resistor-capacitor (RC) filter module and a debounce filter module in accordance with an embodiment of the present disclosure.
Figure 3:
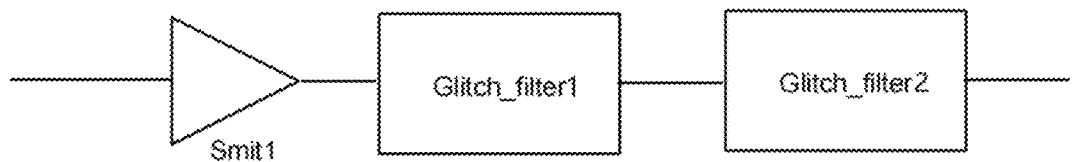
FIG. 3 is a circuit diagram of a buffer-delay portion in FIG. 2.

Referring to FIGS. 2-3, in this embodiment, the switch-triggering loop includes a resistor-capacitor (RC) filter module, a debounce filter module and an enable signal generating module. The RC filter module includes a first filter resistor R11, a second filter resistor R12 and a third filter resistor R13. A first end of the first filter resistor R11 is connected to ground. A second end of the first filter resistor R11 is connected to a first end of the second filter resistor R12. A second end of the second filter resistor R12 is connected to the internal power supply end VDD. A first end of the third filter resistor R13 is connected to the second end of the first filter resistor R11 and the first end of the second filter resistor R12. A second end of the third filter resistor R13 is connected to the debounce filter module. The debounce filter module includes a Schmitt trigger smit1, a first first-order filter Glitch_filter1 and a second first-order filter Glitch_filter2. An input end of the Schmitt trigger smit1 is connected to the third filter resistor R13. An output end of the Schmitt trigger smit1 is connected to an input end of the first-order filter Glitch_filter1. An output end of the first first-order filter Glitch_filter1 is connected to an input end of the second first-order filter Glitch_filter2.

An output end of the second first-order filter Glitch_filter2 is connected to an input end of the enable signal generating module. When the external switch is triggered, the switch-triggering loop should accurately sense the triggering action. Therefore, in the driver circuit provided in this embodiment, the switch-triggering loop is provided with the RC filter module and the debounce filter module to eliminate noise that may enter the circuit, prevent the external switch from being accidentally touched to interfere with a circuit operation, and ensure that the triggering action of the external switch can be accurately sensed by the circuit.

Figure 4:
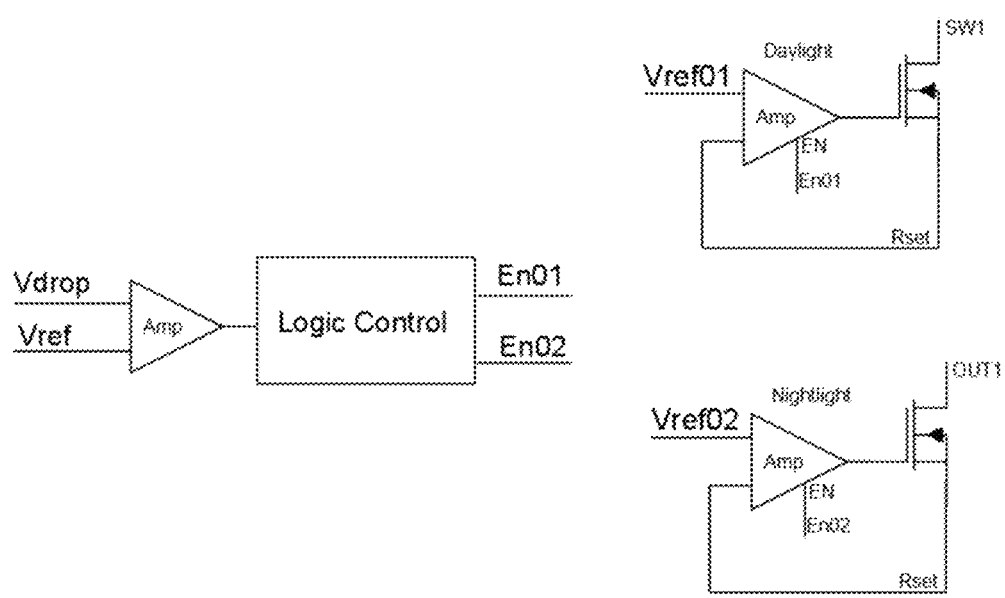
FIG. 4 is a circuit diagram of an enable signal generating module in accordance with an embodiment of the present disclosure.

Referring to FIG. 4, in an embodiment, the enable signal generating module includes a voltage comparator Amp and a voltage logic controller Logic Control. A non-inverting input end of the voltage comparator Amp is connected to an output end of the second first-order filter Glitch_filter2. An inverting input end of the voltage comparator Amp is connected to a reference voltage signal. An output end of the voltage comparator Amp is connected to an input end of the voltage logic controller Logic Control. An output end of the voltage logic controller Logic Control is configured to output two enable signals.

Figure 5:
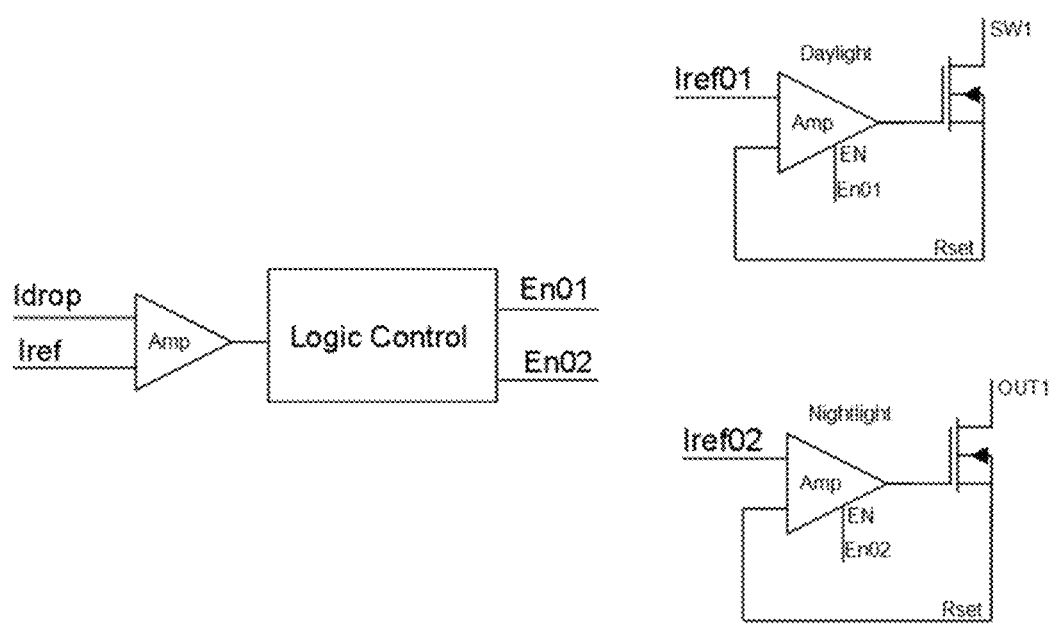
FIG. 5 is a circuit diagram of an enable signal generating module in accordance with another embodiment of the present disclosure.

Referring to FIG. 5, in an embodiment, the enable signal generating module includes a current comparator Amp and a current logic controller Logic Control. A non-inverting input end of the current comparator Amp is connected to an output end of the second first-order filter Glitch_filter2. An inverting input end of the current comparator Amp is connected to a reference current signal. An output end of the current comparator Amp is connected to an input end of the current logic controller Logic Control. An output end of the current logic controller Logic Control is configured to output two enable signals.

Figure 6:
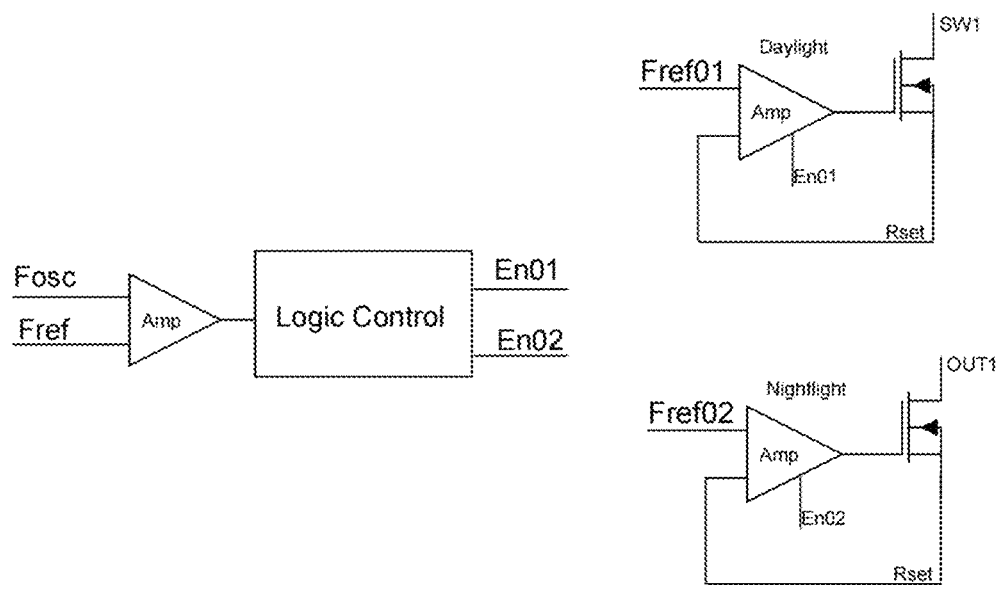
FIG. 6 is a circuit diagram of an enable signal generating module in accordance with another embodiment of the present disclosure.

Referring to FIG. 6, in an embodiment, the enable signal generating module includes a frequency comparator Amp and a frequency logic controller Logic Control. A non-inverting input end of the frequency comparator Amp is connected to an output end of the second first-order filter Glitch_filter2. An inverting input end of the frequency comparator Amp is connected to a reference frequency signal. An output end of the frequency comparator Amp is connected to an input end of the frequency logic controller Logic Control. An output end of the frequency logic controller Logic Control is configured to output two enable signals. When the driver circuit is applied to a specific circuit, a voltage signal, a current signal or a switching pulse signal at the external switch can be chosen and collected by the switch-triggering loop as a basis for detection depending on a specific situation, and a corresponding enable signal generating module is selected to generate an appropriate and available enable signal.

In this embodiment, the output loop includes two output modules. An input end of each of the two output modules is configured to receive a drive signal of the dimming drive loop. An on-off control end of each of the two output modules is connected to an enable signal of the enable signal generating module. An output end of each of the two output modules is configured to be connected to an external LED light. Each of the two output modules includes an output operational amplifier and an output switch tube. A non-inverting input end of the output operational amplifier is connected to a drive signal of the dimming drive loop. An inverting input end of the output operational amplifier is connected to a source of the output switch tube. A control end of the output operational amplifier is connected to an enable signal of the enable signal generating module. An output end of the output operational amplifier is configured as an output port for connection with an external LED light. When the driver circuit is applied to the drive of a specific LED light group with more than two LED lights, a corresponding number of output ports are set, and an enable signal and a drive signal are generated corresponding to each of the output ports. Therefore, the driver circuit provided in this embodiment can easily drive multi-channel LED light group, and provide a stable and independent circuit for each channel of LED lights, which can freely control the connection or disconnection of said LED lights.

Figure 7:
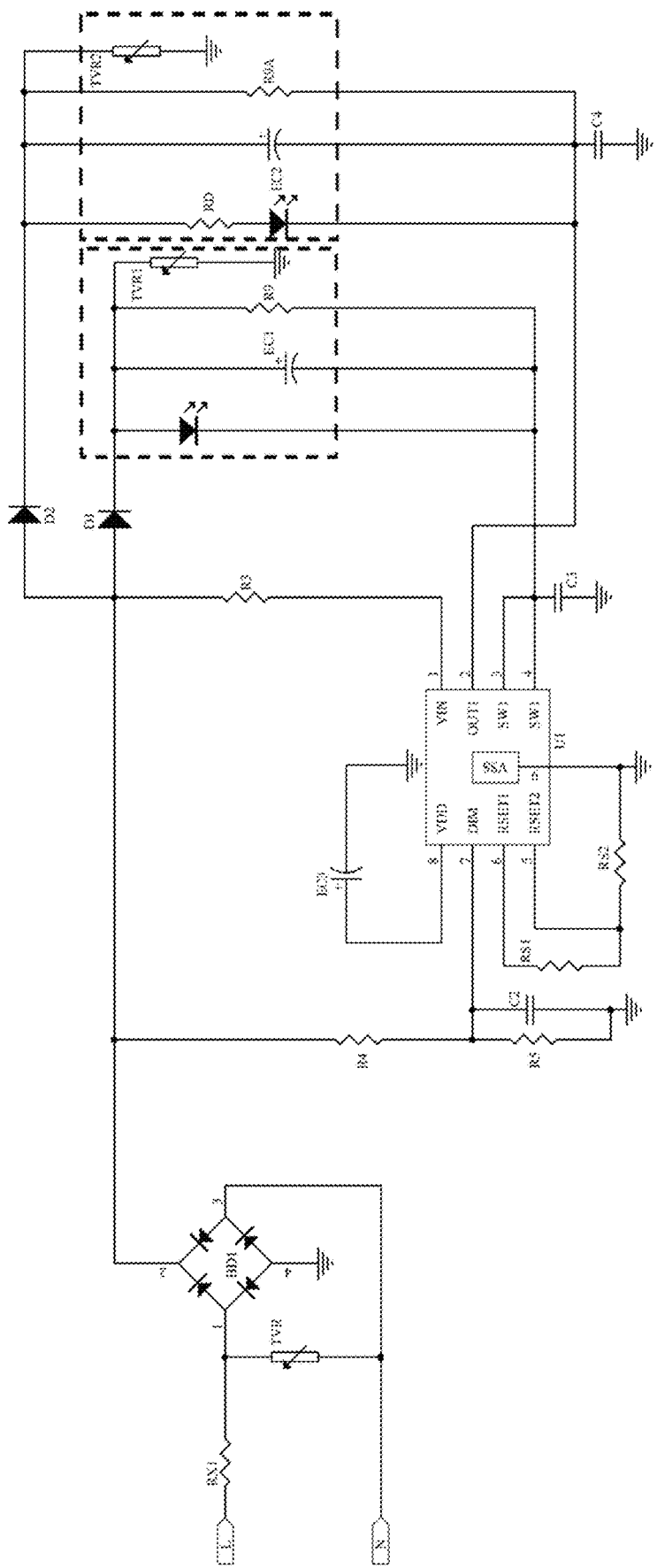
FIG. 7 is an overall circuit diagram of the multi-channel LED linear driver circuit in accordance with an embodiment of the present disclosure after packaged as an integrated circuit (IC) and applied to the drive of a two-channel LED light group.

In an embodiment, referring to FIG. 7, the multi-channel LED linear driver circuit is packaged as an integrated circuit (IC) and applied to the drive a first specific two-channel LED light group.

In addition to the above IC formed by the IC formed by packaging the multi-channel LED linear driver circuit, the circuit further includes an AC-DC module, an IC peripheral component, a first LED light group and a second LED light group. The AC-DC module includes an input resistor RX1, an input varistor TVR and a rectifier bridge BD1. A first end of the input resistor RX1 is connected to a live wire L of an external AC power supply. A second end of the input resistor RX1 is connected to a first end of the input varistor TVR. A second end of the input varistor TVR is connected to a neutral line N of the external AC power supply. A first input end of the rectifier bridge BD1 is connected to the second end of the input resistor RX1 and the first end of the input varistor TVR. A second input end of the rectifier bridge BD1 is connected to the neutral line N of the external AC power supply. An output end of the rectifier bridge BD1 is connected to ground.

The IC peripheral component includes a first resistor R4, a second resistor R5, a first capacitor C2, a third resistor RS1, a fourth resistor RS2, a first polar capacitor EC3, a second capacitor C3 and a fifth resistor R3. A first end of the first resistor R4 is connected to an output end of the rectifier bridge BD1. A second end of the first resistor R4 is connected to a first end of the second resistor R5. A second end of the second resistor R5 is connected to ground. A first end of the first capacitor C2 is connected to the second end of the first resistor R4 and the first end of the second resistor R5. A second end of the first capacitor C2 is connected to ground. A DIM pin of the IC is connected to the second end of the first resistor R4, the first end of the second resistor R5 and the first end of the first capacitor C2. A first end of the third resistor RS1 is connected to a RSET1 pin of U1 of the IC. A second end of the third resistor RS1 is connected to a first end of the fourth resistor RS2. A second end of the fourth resistor RS2 is connected to ground. A RSET2 pin of U1 is connected to the second end of the third resistor RS1 and the first end of the fourth resistor RS2 a. A negative electrode of the first polar capacitor EC3 is connected to ground. A positive electrode of the first polar capacitor EC3 is connected to a VDD pin of the IC. The first end of the second capacitor C2 is connected to a SW1 pin of U1. The second end of the second capacitor C2 is connected to ground. A first end of the fifth resistor R3 is connected to a VIN pin of U1. A second end of the fifth resistor R3 is connected to the output end of the rectifier bridge BD1 and the first end of the first resistor R4. A voltage across the first polar capacitor EC3 is a specific value of a switching voltage provided by U1.

The first LED light group includes a first diode D1, a first LED, a first load polar capacitor EC1, a first load resistor R9 and a first load voltage-sensitive TVR1. An anode of the first diode D1 is connected to the second end of the fifth resistor R3 and the output end of the rectifier bridge BD1. A cathode of the first diode D1 is connected to an anode of the first LED. A cathode of the first LED is connected to a SW1 pin of U1 of the IC. An anode of the first load polar capacitor EC1 is connected the cathode of the first diode D1. A cathode of the first load polar capacitor EC1 is connected to the SW1 pin of U1. A first end of the first load resistor R9 is connected to the cathode of the first diode D1. A second end of the first load resistor R9 is connected to the SW1 pin of U1. A first end of the first load varistor TVR1 is connected to the cathode of the first diode D1. A second end of the first load varistor TVR1 is connected to ground.

The second LED light group includes a second diode D2, a second LED, a second load polar capacitor EC2, a second load resistor R9A and a second load voltage-sensitive TVR2. An anode of the second diode D2 is connected to the second end of the fifth resistor R3 and the output end of the rectifier bridge BD1. A cathode of the second diode D2 is connected to an anode of the second LED. A cathode of the second LED is connected to an OUT1 pin of U1. An anode of the second load polar capacitor EC2 is connected to the cathode of the second diode D2. A cathode of the second load polar capacitor EC2 is connected to an OUT1 pin of U1. A first end of the second load resistor R9A is connected to the cathode of the second diode D2. A second end of the second load resistor R9A is connected to the OUT1 pin of U1. A first end of the first load varistor TVR2 is connected to the cathode of the second diode D2. A second end of the second load varistor TVR2 is connected to ground.

Figure 8:
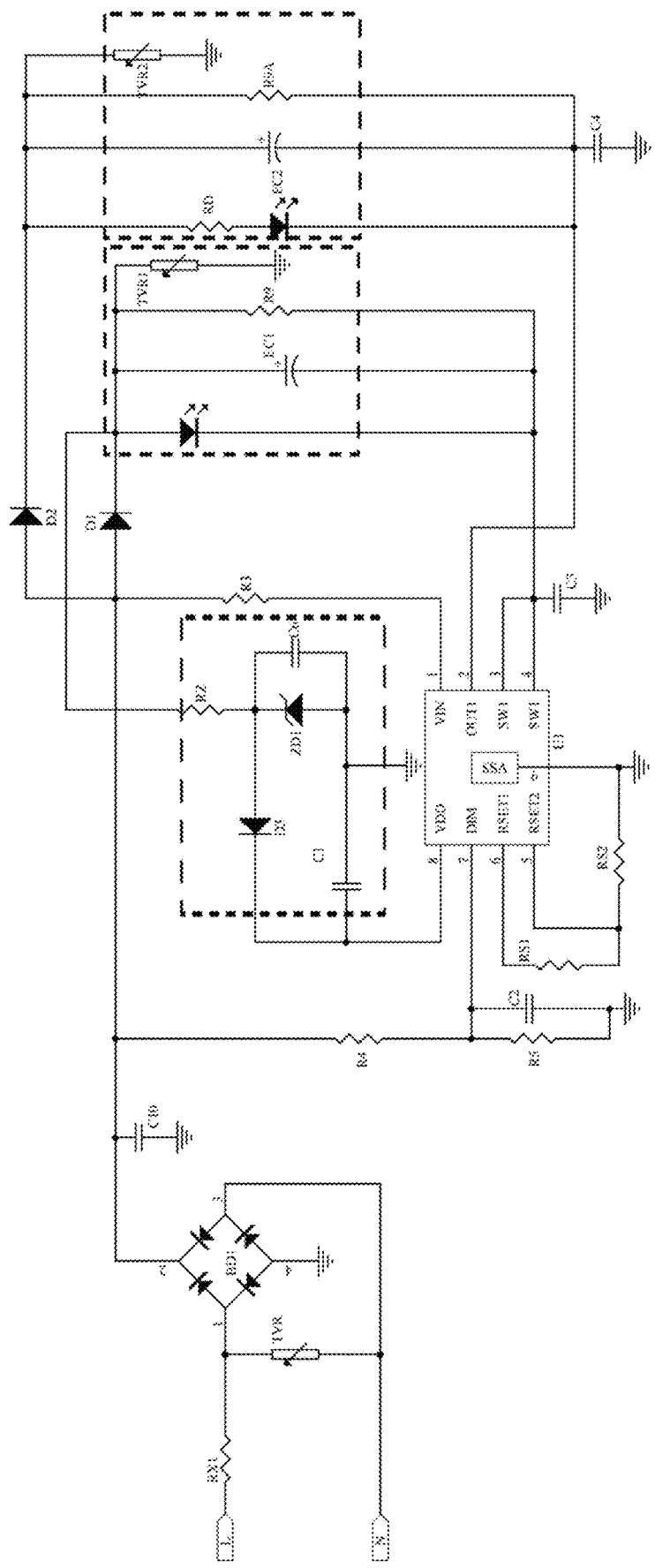
FIG. 8 is an overall circuit diagram of the multi-channel LED linear driver circuit in accordance with an embodiment of the present disclosure after packaged as an integrated circuit (IC) and applied to the drive of another two-channel LED light group.

In an embodiment, referring to FIG. 8, the multi-channel LED linear driver circuit is packaged as an integrated circuit (IC) and applied to the drive of a second specific two-channel LED light group, a specific driver circuit is provided as follows.

In addition to the above IC formed by the IC formed by packaging the multi-channel LED linear driver circuit, the circuit further includes an AC-DC module, an IC peripheral component, a first LED light group and a second LED light group. The AC-DC module includes an input resistor RX1, an input varistor TVR and a rectifier bridge BD1. A first end of the input resistor RX1 is connected to a live wire L of an external AC power supply. A second end of the input resistor RX1 is connected to a first end of the input varistor TVR. A second end of the input varistor TVR is connected to a neutral line N of the external AC power supply. A first input end of the rectifier bridge BD1 is connected to the second end of the input resistor RX1 and the first end of the input varistor TVR. A second input end of the rectifier bridge BD1 is connected to the neutral line N of the external AC power supply. An output end of the rectifier bridge BD1 is connected to ground.

The first LED light group includes a first diode D1, a first LED, a first load polar capacitor EC1, a first load resistor R9 and a first load voltage-sensitive TVR1. An anode of the first diode D1 is connected to a second end of a fifth resistor R3 and an output end of a rectifier bridge BD1. A cathode of the first diode D1 is connected to an anode of the first LED. A cathode of the first LED is connected to a SW1 pin of U1 of the IC. An anode of the first load polar capacitor EC1 is connected the cathode of the first diode D1. A cathode of the first load polar capacitor EC1 is connected to the SW1 pin of U1. A first end of the first load resistor R9 is connected to the cathode of the first diode D1. A second end of the first load resistor R9 is connected to the SW1 pin of U1. A first end of the first load varistor TVR1 is connected to the cathode of the first diode D1. A second end of the first load varistor TVR1 is connected to ground.

The second LED light group includes a second diode D2, a second LED, a second load polar capacitor EC2, a second load resistor R9A and a second load voltage-sensitive TVR2. An anode of the second diode D2 is connected to the second end of the fifth resistor R3 and the output end of the rectifier bridge BD1. A cathode of the second diode D2 is connected to an anode of the second LED. A cathode of the second LED is connected to an OUT1 pin of U1. An anode of the second load polar capacitor EC2 is connected to the cathode of the second diode D2. A cathode of the second load polar capacitor EC2 is connected to an OUT1 pin of U1. A first end of the second load resistor R9A is connected to the cathode of the second diode D2. A second end of the second load resistor R9A is connected to the OUT1 pin of U1. A first end of the first load varistor TVR2 is connected to the cathode of the second diode D2. A second end of the second load varistor TVR2 is connected to ground.

The IC peripheral component includes a first resistor R4, a second resistor R5, a first capacitor C2, a third resistor RS1, a fourth resistor RS2, a first voltage switching capacitor C1, a second voltage switching capacitor C6, a voltage switching diode D3, a voltage switching regulator tube ZD1, a voltage switching resistor RZ, a second capacitor C3 and the fifth resistor R3. A first end of the first resistor R4 is connected to an output end of the rectifier bridge BD1. A second end of the first resistor R4 is connected to a first end of the second resistor R5. A second end of the second resistor R5 is connected to ground. A first end of the first capacitor C2 is connected to the second end of the first resistor R4 and the first end of the second resistor R5. A second end of the first capacitor C2 is connected to ground. A DIM pin of the IC is connected to the second end of the first resistor R4, the first end of the second resistor R5 and the first end of the first capacitor C2. A first end of the third resistor RS1 is connected to a RSET1 pin of U1 of the IC. A second end of the third resistor RS1 is connected to a first end of the fourth resistor RS2. A second end of the fourth resistor RS2 is connected to ground. An RSET2 pin of U1 is connected to the second end of the third resistor RS1 and the first end of the fourth resistor RS2. A first end of the first voltage switching capacitor C1 is connected to a VDD pin of U1. A second end of the first voltage switching capacitor C1 is connected to ground. A cathode of the voltage switching diode D3 is connected to the VDD pin of U1. An anode of the voltage switching diode D3 is connected to a first end of the voltage switching resistor RZ. A second end of the voltage switching resistor RZ is connected to the cathode of the first diode D1 and the anode of first LED. A first end of the second voltage switching capacitor C6 is connected to an anode of the voltage switching regulator tube ZD1. A second end of the second voltage switching capacitor C6 is connected to a cathode of the voltage switching regulator tube ZD1. A first end of the second capacitor C2 is connected to the SW1 pin of U1. A second end of the second capacitor C2 is connected to ground. A first end of the fifth resistor R3 is connected to a VIN pin of U1. A second end of the fifth resistor R3 is connected to the output end of the rectifier bridge BD1 and the first end of the first resistor R4. A voltage of the voltage switching regulator tube ZD1 is a value of a switching voltage. In some embodiments, the voltage of the voltage switching regulator tube ZD1 is smaller than a voltage of the VDD pin of U1. After the circuit is powered on, the voltage of the VDD pin of U1 can rise to about 7.5 V. At this time, the voltage of the voltage switching regulator tube ZD1 is less than 7.5V, and the voltage switching diode D3 is cut off without conduction. Once the external switch operates, the voltage at the VDD pin of U1 decreases rapidly. At this time, the voltage of the voltage switching regulator diode ZD1 is higher than that at the VDD pin of U1. The voltage switching diode D3 is forward-conducting. The voltage of the voltage switching regulator tube ZD1 can be added to the VDD pin in U1 through the voltage switching diode D3. The voltage of the voltage switching regulator tube ZD1 is just enough to ensure a normal switching of SW1 and OUT1 in U1. A sampling end of the voltage switching regulator tube ZD1 is connected to a positive end of the first electrolytic capacitor EC1. The voltage of the voltage switching regulator tube ZD1 can be maintained for a period of time, during which a switching channel operation can be completed.

The embodiments described above are merely illustrative of the present disclosure, and are not intended to limit the scope of the present disclosure. It should be noted that any modifications, variations and replacements made without departing from the concept of the disclosure shall fall within the scope of the disclosure defined by the appended claims.

What is claimed is:

1. A multi-channel light-emitting diode (LED) linear driver circuit, comprising:
    a switch-triggering loop;
    a dimming drive loop; and
    an output loop;
    wherein the switch-triggering loop is configured to detect whether an external switch is triggered, and send a switching control signal in response to a case that the external switch is triggered;
    the dimming drive loop is configured to generate at least two drive signals respectively configured to drive at least two external LED lights to operate; and
    the output loop comprises at least two output ports in one-to-one correspondence with the least two drive signals; the least two drive signals are configured to be respectively transmitted to the at least two output ports; the switch-triggering loop is connected to the output loop; and the switching control signal is configured to control connection or disconnection of each of the at least two output ports.

2. The multi-channel LED linear driver circuit of claim 1, further comprising:
    an internal power conversion loop;
    wherein an input end of the internal power conversion loop is connected to an external direct current (DC) power supply or an external alternating current (AC) power supply; and an output end of the internal power conversion loop is configured as an internal power supply end.

3. The multi-channel LED linear driver circuit of claim 2, wherein the switch-triggering loop comprises a resistor-capacitor (RC) filter module, a debounce filter module and an enable signal generating module; an input end of the RC filter module is configured to interact with the external switch; an output end of the RC filter module is connected to an input end of the debounce filter module; an output end of the debounce filter module is connected to the enable signal generating module; and an output end of the enable signal generating module is configured to generate the switching control signal.

4. The multi-channel LED linear driver circuit of claim 3, wherein the RC filter module comprises a first filter resistor, a second filter resistor and a third filter resistor; a first end of the first filter resistor is connected to ground, a second end of the first filter resistor is connected to a first end of the second filter resistor, and a second end of the second filter resistor is connected to the internal power supply end; and a first end of the third filter resistor is connected to the second end of the first filter resistor and the first end of the second filter resistor, and a second end of the third filter resistor is connected to the debounce filter module.

5. The multi-channel LED linear driver circuit of claim 4, wherein the debounce filter module comprises a Schmitt trigger and at least one first-order filter; the at least one first-order filter is sequentially arranged; an input end of the Schmitt trigger is connected to the third filter resistor, and an output end of the Schmitt trigger is connected to an input end of a first one among the at least one first-order filter; and an output end of the first one among the at least one first-order filter is connected to an input end of a second one among the at least first-order filter or an input end of the enable signal generating module.

6. The multi-channel LED linear driver circuit of claim 5, wherein the enable signal generating module comprises a voltage comparator and a voltage logic controller; a non-inverting input end of the voltage comparator is connected to an output end of a last one among the at least one first-order filter; an inverting input end of the voltage comparator is connected to a reference voltage signal; an output end of the voltage comparator is connected to an input end of the voltage logic controller; and an output end of the voltage logic controller is configured to output at least two enable signals.

7. The multi-channel LED linear driver circuit of claim 6, wherein the output loop comprises at least two output modules; an input end of each of the at least two output modules is configured to receive a corresponding one of the at least two drive signals; an on-off control end of each of the at least two output modules is configured to receive a corresponding one of the at least two enable signals; and an output end of each of the at least two output modules is configured to be connected to a corresponding one of the at least two external LED lights.

8. The multi-channel LED linear driver circuit of claim 7, wherein each of the at least two output modules comprises an output operational amplifier and an output switch tube; a non-inverting input end of the output operational amplifier is connected to one of the at least two drive signals; an inverting input end of the output operational amplifier is connected to a source of the output switch tube; a control end of the output operational amplifier is connected to one of the at least two enable signals; and an output end of the output operational amplifier is configured as one of the at least two output ports for connection with one of the at least two external LED lights.

9. The multi-channel LED linear driver circuit of claim 5, wherein the enable signal generating module comprises a current comparator and a current logic controller; a non-inverting input end of the current comparator is connected to an output end of a last one among the at least one first-order filter; an inverting input end of the current comparator is connected to a reference current signal; an output end of the current comparator is connected to an input end of the current logic controller; and an output end of the current logic controller is configured to output at least two enable signals.

10. The multi-channel LED linear driver circuit of claim 5, wherein the enable signal generating module comprises a frequency comparator and a frequency logic controller; a non-inverting input end of the frequency comparator is connected to an output end of a last one among the at least one first-order filter; an inverting input end of the frequency comparator is connected to a reference frequency signal; an output end of the frequency comparator is connected to an input end of the frequency logic controller; and an output end of the frequency logic controller is configured to output at least two enable signals.

* * * * *